Jan. 5, 1932.　　　C. F. RYBA　　　1,839,597
STRAW SPREADER
Filed July 12, 1929　　2 Sheets-Sheet 1

INVENTOR
Charly F. Ryba
BY
ATTORNEY

Jan. 5, 1932. C. F. RYBA 1,839,597
STRAW SPREADER
Filed July 12, 1929 2 Sheets-Sheet 2

INVENTOR
Charly F. Ryba
BY Arthur C. Brown
ATTORNEY

Patented Jan. 5, 1932

1,839,597

UNITED STATES PATENT OFFICE

CHARLY F. RYBA, OF ATWOOD, KANSAS

STRAW SPREADER

Application filed July 12, 1929. Serial No. 377,774.

My invention relates to straw spreading devices and more particularly to devices operable by thresher operating mechanism for spreading straw, the principal objects of the invention being to scatter straw into several directions from the path of a supporting vehicle, to discharge the straw with appreciable velocity horizontally from the path of the vehicle, to assure delivery of straw to spreading mechanism so that the spreading movement of all the straw may be controlled, and to prevent interference of air currents with the movement of straw into the spreading mechanism.

In accomplishing these and other objects of the invention, I have provided improved details of structure, the preferred form of which is illustrated in the accompanying drawings, wherein.

Figure 1:
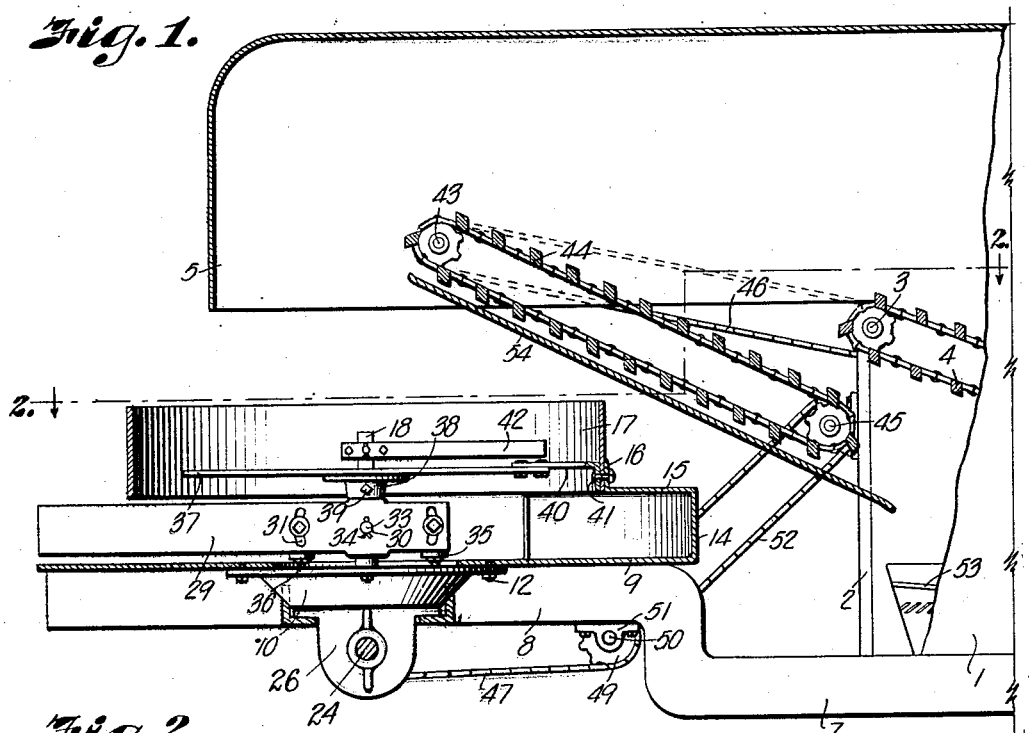
Fig. 1 is a longitudinal vertical section of one end of a vehicle and my improved straw spreading device mounted thereon for operation by mechanism on said vehicle.
Figure 2:
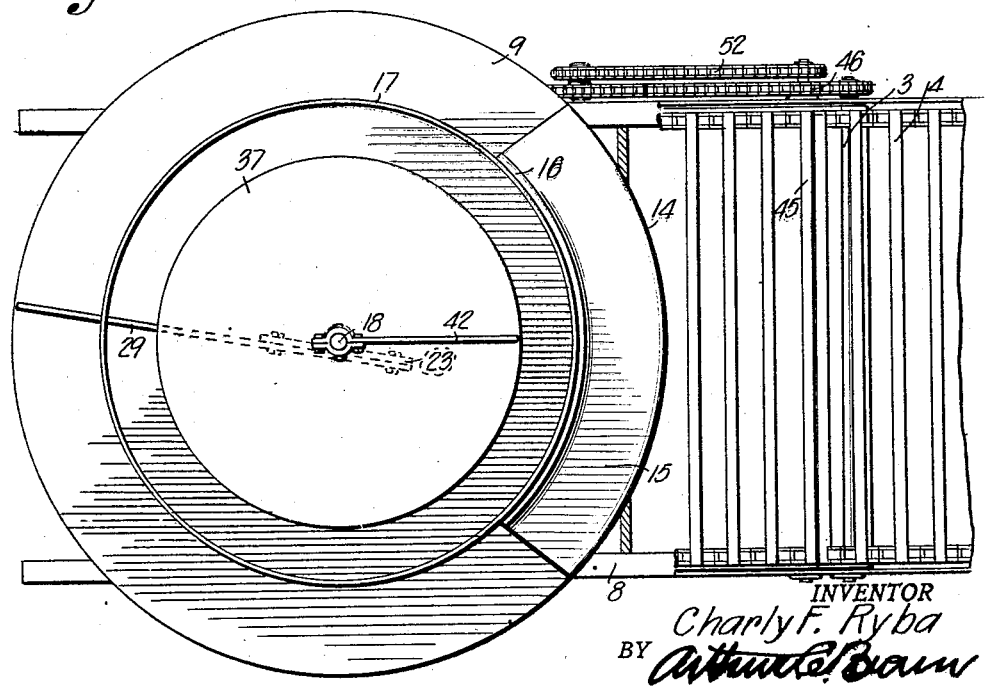
Fig. 2 is a section through the machine on the line 2—2, Fig. 1, showing a plan view of the end of the vehicle and the spreading device.
Figure 3:
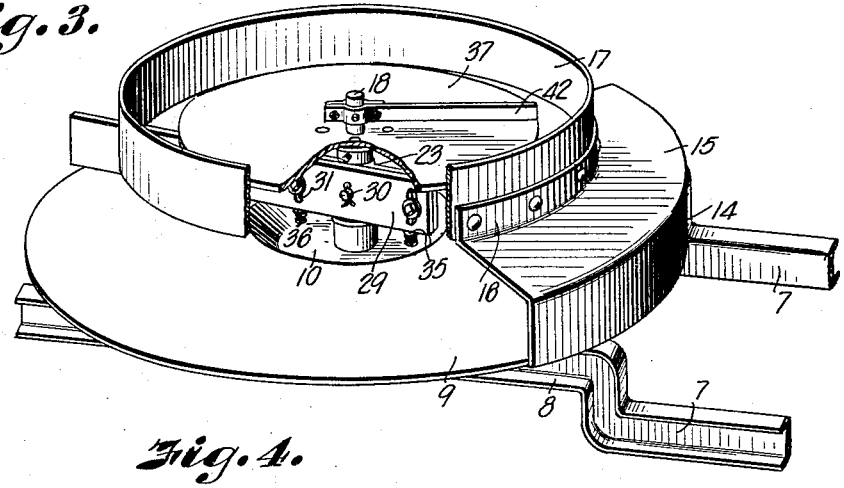
Fig. 3 is a perspective view of the spreader and portions of supporting bars, a straw receiving disk being shown partly broken away to better show portions of a rotating shaft and a straw discharging arm mounted on the shaft.
Figure 4:
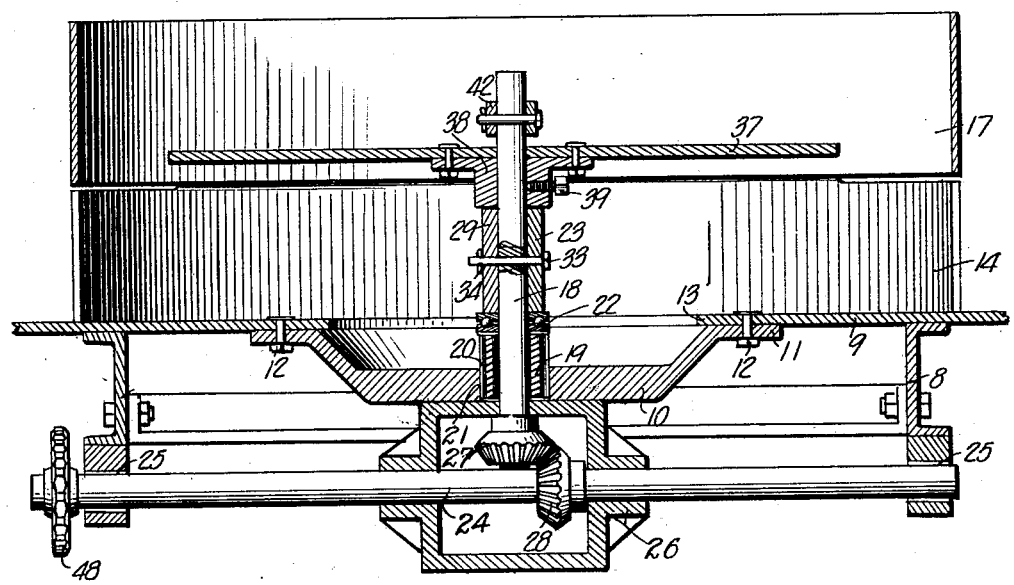
Fig. 4 is an enlarged central section of the straw spreading device and an operating shaft.
Figure 5:
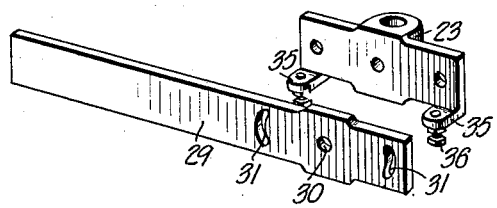
Fig. 5 is a detailed perspective view of a straw discharging arm and a bracket for adjustably supporting the arm.

Referring in detail to the drawings:

1 designates generally a supporting vehicle having actuating mechanism, for example, a combined harvester and thresher which will be referred to as a combine, and including a frame 2, the actuating mechanism including a rotating shaft 3 supported by the frame for moving a straw raddle 4 adapted to transfer straw from the threshing mechanism toward one end of the combine for discharge therefrom.

A hood 5 projects rearwardly from the combine to receive straw discharged from the raddle and direct the same downwardly for distribution to the ground.

Projecting rearwardly from the combine and supported by the frame thereof are parallel arms or bars 7 formed preferably of channel irons and comprising a horizontal frame or bracket adapted to support straw spreading mechanism presently described, in spaced relation with the rear end of the combined frame. The channels have upbent portions 8 whereby the outer ends are offset for elevating the spreading mechanism above the level of the frame members to which the bracket may be attached, and thus supporting the spreading device adjacent the end or discharge mouth portion of the hood.

The spreading mechanism includes a table 9 mounted on the bracket bars 7 and comprising preferably a disk having a depressed central portion 10 preferably comprising a plate or pan-like member having flanges 11 secured by bolts 12 at the edges of a central opening 13 in the table.

A vertical arcuate shield or curtain 14 extends over a part of the periphery of the table adjacent the combine, comprising preferably an upturned extension of the table, and has a horizontal flange 15 at its upper edge extending inwardly and provided with a vertical flange 16 at its inner arcuate edge for supporting an annular shield or guide chute 17 close to the hood to restrict the flow of straw from the hood toward the table and prevent interference of air currents with the stream of straw passing from the hood to the spreader.

A shaft 18 extending upwardly through the table is rotatable in bearings 19 mounted in a sleeve 20 fixed in an axial opening 21 of the recessed central plate 10, the shaft being rotatably supported by bearings 22 mounted on said sleeve 20 to receive a bracket 23 fixed to the shaft and later described. A counter shaft 24 is rotatably mounted in bearings 25 on the supporting bars 7, and in bearing bosses in opposite walls of a gear-covering casing or bracket 26 dependingly supported by the plate 10. A bevel gear 27 on the lower end of the shaft 18 is meshed with a pinion 28 on said shaft 24 within the casing for rotating the shaft 18.

A sweep or rotating discharge arm 29 is adjustably fixed to the bracket 23 and adapted to swing adjacent the upper surface of the table for moving straw therefrom.

The arm 29 is preferably provided with a mounting aperture 30 and arcuate vertical slots 31 on opposite sides of the aperture, and the bracket 23 is sleeved on the shaft and fixed thereto by a bolt 33 extending through the shaft, the outer end of the bolt extending through the sweep arm and receiving a cotter pin 34 whereby the arm may be retained pivotally on the bracket.

The bracket 23 is elongated, and parallel spaced ears 35 projecting laterally from opposite ends thereof are provided with set screws 36 operable against the lower edge of the arm for tilting the arm on its pivot support and latching the same in tilted position for varying the angular relation of the arm to the shaft and the spacing of the arm from the table.

Mounted on the shaft 18 above the arm 29 within the shield 17 is a disk 37 comprising a plate having smaller area than the table whereby the periphery of the disk is spaced from the shield 17 and from the edge of the table. The disk 37 is adapted to receive straw falling from the hood for controlling the movement of straw toward the table.

The disk is preferably fixed on a collar 38 provided with a set screw 39 whereby it may be latched to the shaft for enabling the shaft to rotate the disk. A latching arm 40 adapted to be attached to the shield 17 and to extend into contact with the disk may be attached to the disk by bolts 41 for fixing the disk against rotation when the set screw 39 is withdrawn from engaged relation with the shaft.

A second sweep or rotating arm 42 is clamped to the upper end of the shaft 18 above the upper disk, and is adapted to be rotated by the shaft for sweeping straw from the upper disk, it being apparent that when the upper disk is stationary the upper sweep will move over the same and when the upper disk is fixed to the shaft 18 the arm and disk will move together for cooperative action to promote movement of straw outwardly toward the shield 17.

The hood is extended rearwardly beyond the normal position to locate its rear end over the spreader. A shaft 43 is rotatably mounted in the sides of the hood above the spreader, and a conveyor 44 runs on said shaft and on a shaft 45 supported by the frame 2 beneath the front end of the raddle to receive straw therefrom and for conveying the same to the rear end of the hood.

The shaft 43 is operated through a chain 46 from the shaft 3, and the shafts 18 and 24 are operated through a chain 47 running on a sprocket 48 on the shaft 24 and a sprocket 49 on a shaft 50 supported in journal brackets 51 on the projecting arms 7, and operated from the shaft 45 through a chain 52.

The ordinary apparatus to which the invention is applied includes a grain shoe 53 adapted to receive grain from the raddle 4 and separate grain from chaff. I provide an inclined chute 54 located below the conveyor 44 and adapted to receive grain that may be carried by the straw toward the rearwardly projecting spreading device, the lower end of the chute projecting over the shoe. The slats of the conveyor move adjacent the chute and the lower run of the continuous conveying belt thus tends to move material over the chute toward the shoe.

An additional separating element is thus provided, whereby grain that otherwise would be discharged with the straw is returned to the shoe, and chaff mixed with the grain may be separated therefrom by the ordinary operation of the shoe.

The lower forwardly projecting end of the chute 54 is spaced vertically from the upper edge of the shoe, so that the currents of air ordinarily impelled through the apparatus may separate chaff from grain falling from the chute toward the shoe, and the chaff will be blown toward the streams of straw that are discharged centrifugally from the spreading device.

In using apparatus constructed as described, straw is delivered to the conveyor 44 and thereby carried to the rear end of the hood to a point in substantially spaced relation with the rear end of the vehicle.

The straw falls toward the spreader, the annular guard preventing interference by cross-currents of air, and guiding the straw to the upper disk. When the disk is stationary, the upper sweep tends to discharge the straw centrifugally from the disk to the table guard, reversing the laterally moved straw and thus restricting it to movement downwardly to the table. When the disk is rotated with the vertical shaft, the straw is centrifugally discharged by the disk, and the upper sweep assists in the discharging action.

Straw falling on the table is swept therefrom centrifugally by the lower sweep in all directions except toward the vehicle, the container on the edge of the table preventing straw from moving toward the vehicle. The sweep moves straw from beneath the curtain and thus prevents clogging.

The lower sweep arm may be readjusted on its bracket into desired tilted position for compensating for wearing of bearings or other causes which may tend to cause the sweep to move in too close relation with the table.

What I claim and desire to secure by Letters Patent is:

1. In a straw spreading device, a support, a substantially circular table mounted on the support, a disk having smaller diameter than the table supported in spaced relation therewith, and means for delivering straw to the disk for movement of the straw from the disk to the table.

2. In a straw spreader device, a table, a disk supported above the table and adapted for movement of straw therefrom to the table, means for delivering straw to the disk, and means for moving straw from the table.

3. In a straw spreader device, a table, a disk having an edge moving in a path spaced inwardly from the edge of the table and supported above the same for movement of straw from the disk to the table, means for delivering straw to the disk, and means including a shaft and an arm fixed to the shaft for moving straw from the table.

4. In a straw spreader device, a table, a disk having smaller area than the table and supported above the same, means for delivering straw to the disk, and means including a shaft extending through the table and disk and arms fixed to the shaft for moving straw from the disk and the table.

5. In a straw spreading device, a table, operating means including a shaft extending rotatably through the table, a disk having smaller area than the table, means for supporting the disk in spaced relation with the table, means for delivering straw to the disk, and means including an arm fixed to said shaft for moving straw delivered to the disk.

6. In a straw spreading device, a table, operating means including a shaft extending rotatably through the table, a disk having smaller area than the table sleeved on the shaft, means for delivering straw to the disk, a shield encircling the disk in spaced relation therewith, and means including an arm fixed to said shaft for moving straw from the table.

7. In straw spreading apparatus including a table and means for delivering straw to the table, a rotating shaft extending through the table, an arm movable over the table for moving straw therefrom, a disk mounted on the shaft above the table, means for keying the disk to the shaft for rotation thereby, and means supported by the table for guiding straw moved by the disk for delivery to the table.

8. In apparatus of the character described, including means for discharging material, a fixed material-supporting table, a disk, means for supporting the disk above the table in spaced relation therewith to intercept material moving toward the table, means for moving material from the disk, and a shield spaced from the disk for restraining lateral movement of material therefrom.

9. A straw spreader including a table, a straw-receiving plate supported in vertically spaced relation with the table, means for moving straw centrifugally from said plate, and means including a shield spaced laterally from said plate for guiding material moving from the plate toward the table.

10. A straw spreader including a table, a straw-receiving plate supported in vertically spaced relation with the table, means for moving straw centrifugally from said plate, and means including a shield spaced laterally from said plate and having lower edges depending below the plane of the plate for guiding material moving from the plate toward the table.

In testimony whereof I affix my signature.

CHARLY F. RYBA.